Dec. 13, 1966   H. I. SHRUBSALL ETAL   3,291,955
SUBMERGED MELT WELDING PROCESS AND APPARATUS
Filed Feb. 25, 1963   2 Sheets-Sheet 1

INVENTORS
HARRY I. SHRUBSALL
HIRAM B. GILSON
BY Barnwell P. King
ATTORNEY

Dec. 13, 1966　　H. I. SHRUBSALL ETAL　　3,291,955
SUBMERGED MELT WELDING PROCESS AND APPARATUS
Filed Feb. 25, 1963　　2 Sheets-Sheet 2
FIG. 4
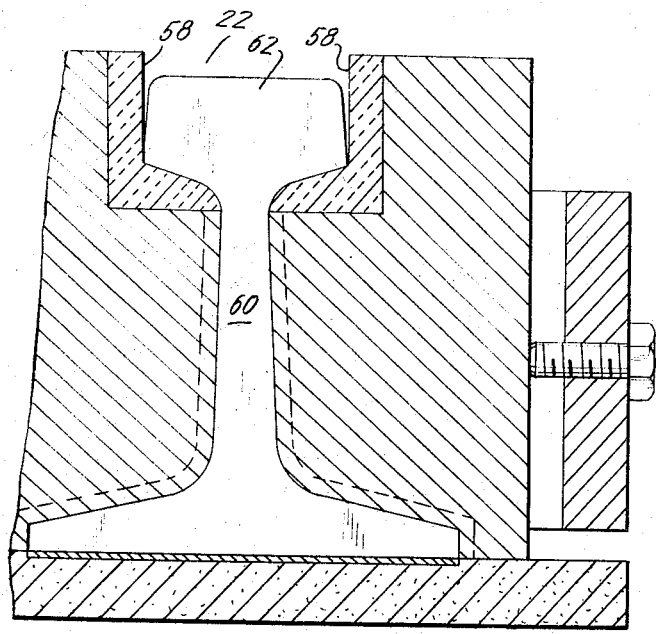
FIG. 8
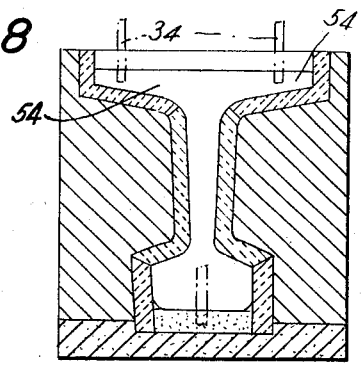
FIG. 5
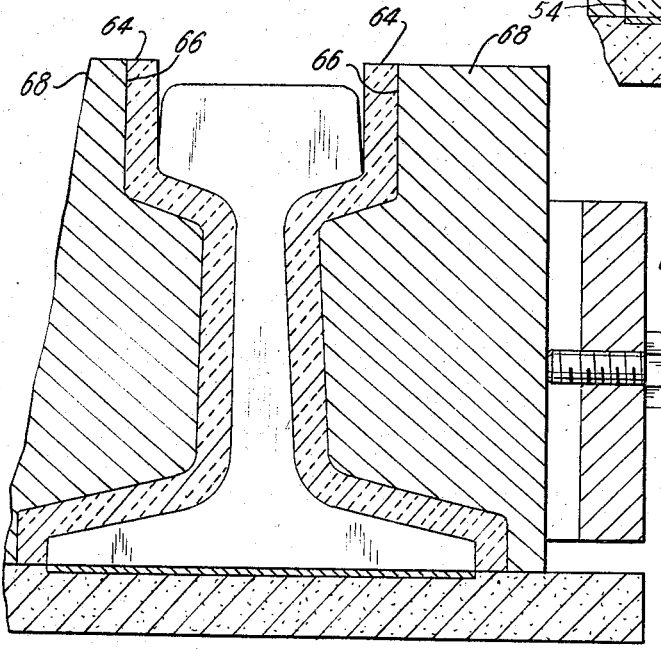
FIG. 6
FIG. 7
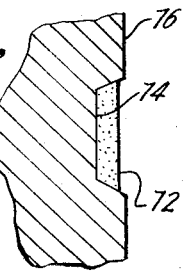
INVENTORS
HARRY I. SHRUBSALL
HIRAM B. GILSON
BY
Barnwell R. King
ATTORNEY

United States Patent Office 3,291,955
Patented Dec. 13, 1966

3,291,955
SUBMERGED MELT WELDING PROCESS
AND APPARATUS
Harry I. Shrubsall, Scotch Plains, and Hiram B. Gilson, Chatham, N.J., assignors to Union Carbide Corporation, a corporation of New York
Filed Feb. 25, 1963, Ser. No. 260,781
11 Claims. (Cl. 219—73)

This invention relates to butt-joint welding of spaced steel members and more particularly to electric submerged-melt welding in which side wall molds are used during the welding operation which proceeds vertically from the bottom to the top of the space between opposing end faces of such members.

The present invention is an improvement in the method disclosed in the copending application, Serial No. 225,811, now Patent No. 3,192,356, dated June 29, 1965, filed September 23, 1962 by Harry I. Shrubsall, one of the co-inventors of the present case; as well as an improvement in the method disclosed by his Patent No. 2,868,951, dated January 13, 1959.

The present invention provides electrically non-conductive wall means for insulating the melt and molten weld metal at opposite sides of the weld space, the effect of which is to cause the weld metal to flow continuously into such space, fusion welding the rail ends, and leaving substantially smooth surfaces of the weld metal in direct contact with such wall means which require substantially no additional finishing after the removal of such means. Such means preferably comprises either pre-cast ceramic or refractory parts which fit into corresponding complementary recesses in metal contour shaping members, or coatings of ceramic on the inner sides of such members.

An unexpected advantage of the invention is that oscillation of the electrode guide tube is minimized. Another advantage is that coating of the electrode guide tube, as in Patent No. 2,868,951, can be avoided. The present method is also faster and much less expensive than the prior art, especially in the case of welding rail joints in situ.

In the drawing:

FIG. 4 is a view in cross-section of a modification of the invention;

FIGS. 5 and 6 are similar views of further modifications;

FIG. 7 is a fragmentary sectional view of another modification; and

FIG. 8 is a view in cross-section of a modification in which the rail parts are inverted during the welding operation.

Figure 1:
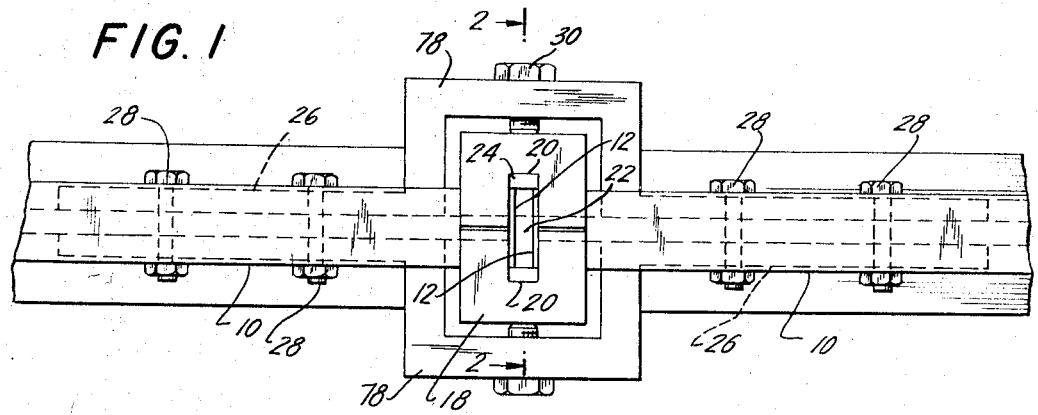
FIG. 1 is a top plan view of a rail joint, prior to welding, provided with side wall molds and clamping means illustrative of the invention.
Figure 2:
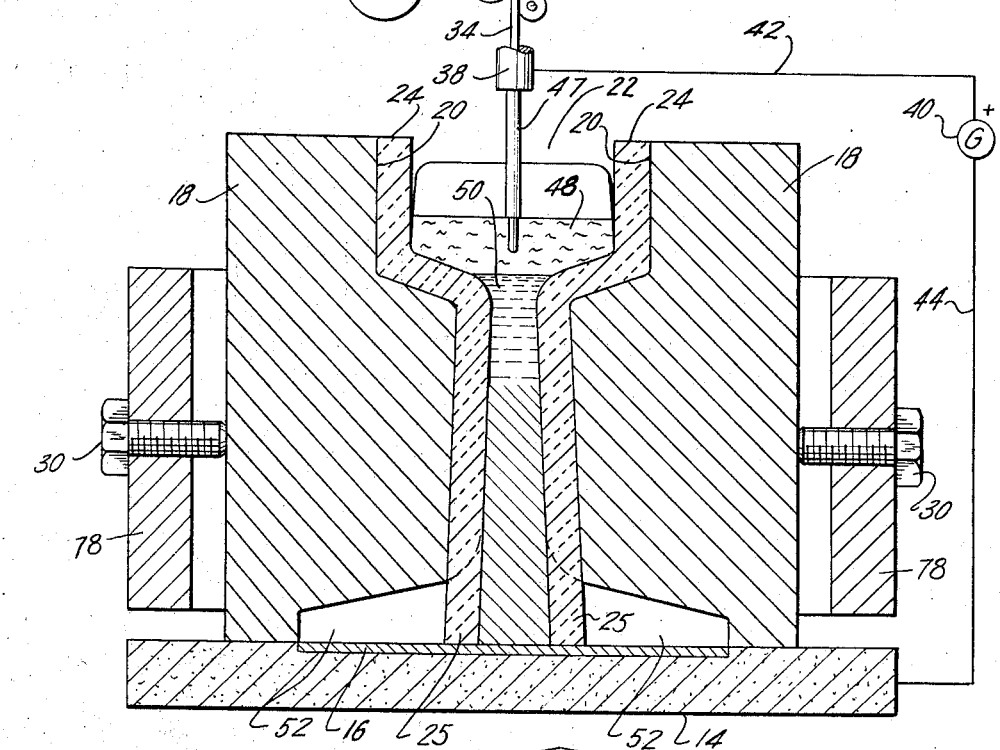
FIG. 2 is a greatly enlarged view mainly in cross-section of the welding set-up.

Referring to the drawings, FIG. 1, rails 10, 10 to be welded are arranged in longitudinal alignment with their end faces 12, 12 spaced apart a predetermined distance of about ¾ of an inch. A base plate 14, FIG. 2, is located under the joint and adjacent end portions of the rails 10. The base plate 14 is preferably composed of electrically conductive material, such as graphite, steel, copper, etc. Disposed between such base plate 14 and the rail end portions is a backup strip 16 composed of steel.

Wall molds 18, 18 are located on opposite sides of the joint to be welded adjacent the rail end portions. Such molds are composed of metal, such as copper, and are provided with vertical recesses or grooves 20 facing the space 22 between the rail end faces and the adjacent sides of the rail end portions. In such vertical grooves 20 are positioned pre-cast ceramic parts 24, 24 that are preferably composed of either Sillimanite (aluminum silicate), or zircon (zirconium silicate). However, any suitable ceramic or refractory material having a melting point that is substantially higher than that of the submerged melt welding composition, i.e., at least 3000° F. can be used in making the parts 24, 24.

In FIG. 2, the parts 24, 24 are preferably in the shape of the contour desired, including a lower extension 25 which extends downwardly in the space 22 between the rail end faces to a level flush with the upper surface of the back-up strip 16. The wall molds 18, 18 are secured in place on opposite sides of the rail end portions by suitably shaped clamps 26, which are secured to the rail ends by bolts 28. The clamps 26 serve not only to secure the wall molds in proper position on opposite sides of the rail end portions but also serve to align, and to secure the rail end portions between the end faces thereof. Set screws 30, 30 located in the outwardly offset portions of the clamps are provided for assuring proper positioning of the mold walls 18, 18 and ceramic parts 24, with respect to the opposite sides of the space 22, permitting slight variations in the dimensions of such parts.

Submerged melt welding apparatus including a reel 32 and a consumable metal electrode 34 in the form of wire or rod is drawn by feed rolls 36 and advanced through a contact tube 38 mounted above the joint to be welded between the rail end faces. The submerged melt welding operation is energized by suitable source of electric welding current such as a generator 40 which is connected by a lead 42 to the contact tube 38 and a lead 44 to the base plate 14. The feed rolls are driven by a motor 46. Mounted on and extending below contact tube 38 is a consumable guide tube 47 which preferably is composed of uncoated steel piping. The submerged melt welding apparatus includes conventional means (not shown) for controlling the operation thereof which is well understood by those skilled in the art.

In operation, a submerged melt welding composition in the form of granules is first supplied to the spacer 22, in an amount sufficient to cover the lower end of the electrode 34 which is fed into such space until it reaches the bottom thereof. The welding current flow is started in such composition by any suitable available means, such as with a ball of steel wool, high frequency, condenser discharge, retract starting, etc. As welding current flows through the end portion of electrode 34 and the granular welding composition at the bottom of space 22, the end portion of the electrode and the welding composition are melted, forming a molten bath between the lower portions 25 of the ceramic parts 24, and the operation progresses upwardly between the ceramic parts 24 at a relatively rapid rate.

The electrically non-conductive inner surface portions 24 of the side wall molds 18 act to thermally confine the heat of the molten composition 48 and weld metal 50 as the operation progresses, thereby substantially increasing the temperature of the molten welding composition 48 and, in turn, the electrical conductivity thereof. As a result, the end of the electrode 34 is progressively melted in the molten submerged melt welding composition 48 before it reaches the molten weld metal 50.

Consumable guide tube 47 serves to conduct the electric welding current to the electrode 34 as it is being fed into the molten welding composition and also guides such electrode so that it is kept centrally located in the space 22 during the operation. Preferably the wire guide tube 47 extends substantially throughout the full length of the space above the molten weld metal. A new guide tube is used for each weld, since it is consumed and contributes to the weld metal. The guide tube simplifies the operation in that the welding apparatus does not need to be elevated during welding operation, as the weld progresses upwardly from the bottom to the top of the rail. Upon completion of the submerged melt welding operation as described above the clamps and side wall molds are removed and the spaces 52, 52 between the flanges 54, 54 at the base of the rail are welded together. The back up strip 16 may be left in place after the welding operation is completed or it may be removed by grinding, if desired.

Figure 3:
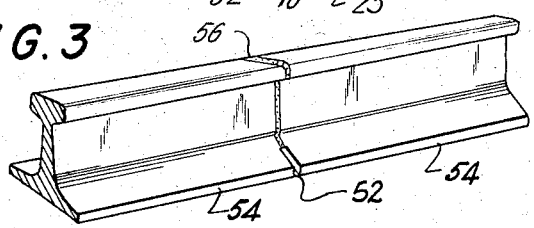
FIG. 3 is a fragmentary perspective view of a rail having a finished joint except in the flange area.

FIG. 3 shows a completed weld 56 except in the flange area.

As shown in FIG. 4, the ceramic inserts 58 may extend only to the underside of the rail-head on opposite sides of the space 22 between the rail end faces 12. This is the most critical area involved, because of the abrupt change in section from the web 60 to the head 62 of the rail in the weld zone. In this case the ceramic parts 58, 58 are smooth on their inner sides, leaving the corresponding surfaces of the head substantially finished when the welding operation is completed and the wall molds are removed.

In FIG. 5 the ceramic parts 64, 64 extend through the entire side contour of the rail, fitting grooves 66 in the molds 68 of copper.

As shown in FIG. 6, the ceramic inserts 70, 70 extend downwardly only to the flanges 54, 54 of the rails.

As shown in FIG. 7, a coating 72 of suitable ceramic material is provided in groove 74 of copper wall mold 76 facing the weld space.

In those cases where the rails to be welded can be turned upside-down or inverted, as shown in FIG. 8, the whole weld can be completed in one operation, according to the invention. The flanges 54, 54 of the rails being welded are welded simply by oscillating the electrode 34 transversely from one side to the other thereof.

The invention contemplates confronting the sides of the submerged-melt weld bath with chemically compatible material that is thermally and electrically non-conductive, of relatively high melting point and of a character to produce smooth weld surfaces at relatively low cost, in combination with thermally non-conductive and electrically conductive means for maintaining the work in circuit with the source of welding current.

The molds 18 and clamping bars 26, FIG. 1, may be made as a single unit, and the bolts 28 may be replaced by hydraulic and/or pneumatic means for securing the parts in fixed relationship before and during the welding operation, with the rail end portions in alignment and the end-faces in the selected spaced relationship. Thus, the clamps comprise rail angle bars composed of steel, wedge-shaped to fit each side of the web-contour adjacent the head and flange of the rail end portions. As shown in FIG. 1, the rail bars are provided with laterally offset central portions 78 encompassing the molds 18, in which the adjustable set-screws 30 are mounted.

What is claimed is:

1. Method of welding a butt-joint between spaced opposing rail-end shaped faces of elongated steel members to be welded, which rail-end shaped faces have opposing surface areas corresponding to the ball, web and flanges of railroad rails, which comprises:
   closing the space between such faces at the bottom of such space with electrically conductive material;
   positioning a consumable metal electrode substantially vertically in such space with the lower end thereof in contact with such material;
   adding granular submerged-melt welding composition in an amount sufficient to cover the starting area in the bottom of such space;
   locating wall molds on opposite sides of said members adjacent such space, having inner surface portions composed of electrically non-conductive material that is substantially higher in melting temperature than that of the submerged-melt welding composition;
   supplying electric welding current to such electrode and electrically conductive material at the bottom of such space to melt such granular composition and adjacent metal of such faces; and
   continuously feeding such electrode downwardly toward the resulting melt until such space is filled with meld metal under a blanket of molten submerged-melt welding composition, thereby fusion welding such parts together;
   said electrically non-conductive inner surface portions of the side wall molds acting to laterally confine the heat of the molten composition and weld metal as the operation progresses, thereby substantially increasing the temperature of the molten welding composition and, in turn, the electrical conductivity thereof, causing the end of the electrode to be progressively melted in the molten submerged-melt welding composition before it reaches the molten weld metal.

2. Method of fusion welding butt-joints between spaced faces of steel members to be welded, which comprises:
   closing the space at the bottom of such faces;
   locating wall molds having electrically non-conductive surface portions on opposite sides of said members adjacent such space;
   covering the end of a consumable metal electrode projecting downwardly into such space with granular submerged-melt welding composition;
   melting such composition with electric current conducted thereto through such members and said electrode;
   fusing the electrode metal and adjacent metal of such faces under such molten welding composition;
   said electrically non-conductive surface portions of the weld molds acting to laterally confine the heat of the molten composition and weld metal as the operation progresses, thereby substantially increasing the temperature of the molten welding composition and, in turn, the electrical conductivity thereof, causing the end of the electrode to be progressively melted in the molten submerged-melt welding composition before it reaches the molten weld metal.

3. Method of welding rail joints which comprises spacing the end faces of steel rail ends to be welded at a preselected distance from each other, locating a base plate of metal under such space and the adjacent rail end portions, clamping weld shaping means contoured to fit opposite sides of the rail end portions adjacent such space and extending above the top of the rails, said means including ceramic surfaces having a melting temperature of at least 3,000° F. for finish-contouring the sides of the weld metal, filling such space with weld metal by the submerged-melt welding process which fuses the metal of the rail end faces, removing such base plate and shaping means from the joint which, upon cooling, solidifies, and finally removing any excess weld metal from the top of the rails.

4. In the art of welding rail joints by the electric submerged-melt welding process, the improvement which comprises supporting the molten material at opposite sides of the joint as the operation progresses upwardly from the bottom to the top of the space between the rail ends with ceramic wall surfaces of weld shaping means located on opposite sides of the rail end portions, such surfaces being smooth and having a melting temperature of at least 3,000° F.

5. In the art of welding rail joints by filling the space between substantially parallel end faces of steel rails with weld metal by the submerged-melt welding process which is started at the bottom and progresses upwardly to the top of such faces, the improvement which comprises insulating the molten material at opposite sides of the space with ceramic wall means having a melting temperature of at least 3,000° F. the effect of which is to cause the weld metal to flow continuously into such space, fusion welding the rail ends, and leaving substantially smooth surfaces of the weld metal in direct contact with such ceramic wall means which require substantially no additional finishing after the removal of such means.

6. Rail joint welding apparatus comprising in combination with a base comprising a member of electrically conductive material located under the joint to be welded; weld metal contour shaping members of metal located on opposite sides of the rails at such joint; means clamping such members in place, and electric submerged-melt welding means including means for continuously feeding a consumable metal electrode and granular welding composition into the space between the rail ends, which welding current flows through said conductive member to progressively fill such space with weld metal; of insulating means composed of ceramic having a melting temperature of at least 3,000° F. disposed on the inner sides of said members facing such joint, acting to insulate the molten weld metal so-filling such joint, during the welding process, from such members, leaving the weld surfaces on opposite sides of the rail smooth and substantially finished when said insulating means members are subsequently removed from the joint.

7. Rail joint welding apparatus as defined by claim 6, in which said ceramic insulating means comprise pre-cast ceramic parts which fit into corresponding complementary recesses in said metal contour shaping members.

8. Rail joint welding apparatus as defined by claim 6, in which said ceramic insulating means comprise ceramic coatings on the inner sides of said members.

9. Rail joint welding apparatus comprising wall molds disposed on opposite sides of end portions of the rails to be welded, in combination with means for clamping said molds in place, and simultaneously securing said rail end portions in fixed alignment with the end faces thereof spaced at a selected distance from each other, both prior to and during the welding operation, in which said clamping means comprises angle bars composed of steel, wedge-shaped to fit each side of web-contour adjacent the head and flange of the rail end portions.

10. Rail joint welding apparatus as defined by claim 9, in which said bars are provided with central laterally offset portions encompassing said molds, and adjustable set screws for engaging said sides of said molds.

11. Method of welding as defined by claim 1, in which the rail-end shaped faces are inverted, with the ball surface areas thereof adjacent the bottom and the flange surface areas thereof adjacent the top, a sump is provided in the electrically conductive material at the bottom of the space between such inverted end faces, and the consumable electrode is transversely oscillated from one side of the mold to the other in the flange area adjacent the top of the weld.

References Cited by the Examiner
UNITED STATES PATENTS 2,824,952  2/1958  Zoethout _____ 219—137

FOREIGN PATENTS 761,680  11/1956  Great Britain.

OTHER REFERENCES

German application: 1,101,653, printed March 9, 1961 (Kl.21h 30/11).

German application: 1,110,343, printed July 6, 1961 (Kl.21h 30/17).

RICHARD M. WOOD, *Primary Examiner.*